US011217396B2

(12) United States Patent
Shin et al.

(10) Patent No.: US 11,217,396 B2
(45) Date of Patent: Jan. 4, 2022

(54) TANTALUM CAPACITOR

(71) Applicant: SAMSUNG ELECTRO-MECHANICS CO., LTD., Suwon-si (KR)

(72) Inventors: Hong Kyu Shin, Suwon-si (KR); Young June Lee, Suwon-si (KR); Yu Jin Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/938,007

(22) Filed: Jul. 24, 2020

(65) Prior Publication Data
US 2021/0210289 A1 Jul. 8, 2021

(30) Foreign Application Priority Data

Jan. 7, 2020 (KR) .......... 10-2020-0001990

(51) Int. Cl.
H01G 9/012 (2006.01)
H01G 9/15 (2006.01)
H01G 9/10 (2006.01)
H01G 9/042 (2006.01)

(52) U.S. Cl.
CPC .............. H01G 9/012 (2013.01); H01G 9/15 (2013.01); H01G 9/042 (2013.01); H01G 9/10 (2013.01)

(58) Field of Classification Search
CPC .................................................. H01G 9/012
See application file for complete search history.

(56) References Cited

U.S. PATENT DOCUMENTS

| 6,512,668 | B1* | 1/2003 | Kim | H01G 9/012 361/509 |
|---|---|---|---|---|
| 9,305,712 | B2 | 4/2016 | Shin et al. | |
| 2005/0146842 | A1 | 7/2005 | Abe et al. | |
| 2011/0038102 | A1 | 2/2011 | Kim et al. | |
| 2015/0213961 | A1* | 7/2015 | Liu | H01G 9/10 361/529 |
| 2015/0270070 | A1 | 9/2015 | Shin et al. | |

FOREIGN PATENT DOCUMENTS

| JP | 2005-039168 A | 2/2005 |
|---|---|---|
| JP | 2005-197457 A | 7/2005 |
| JP | 2010-80570 A | 4/2010 |
| KR | 10-0996915 B1 | 11/2010 |
| KR | 10-2015-0109788 A | 10/2015 |

OTHER PUBLICATIONS

Office Action issued in corresponding Korean Patent Application No. 10-2020-0001990 dated Mar. 19, 2021, with English translation.

* cited by examiner

Primary Examiner — Eric W Thomas
(74) Attorney, Agent, or Firm — Morgan, Lewis & Bockius LLP

(57) ABSTRACT

A tantalum capacitor includes a tantalum body having a tantalum wire exposed from one surface; a positive electrode terminal including a first electrode portion connected to the tantalum wire and a second electrode portion connected to be perpendicular to the first electrode portion; wherein the first electrode portion includes a first protrusion disposed in a tantalum wire direction, and the tantalum wire includes a first groove disposed in a tantalum body direction, wherein the first groove and the first protrusion are connected to each other.

18 Claims, 8 Drawing Sheets

TANTALUM CAPACITOR

CROSS-REFERENCE TO RELATED APPLICATION(S)

This application claims the benefit of priority to Korean Patent Application No. 10-2020-0001990 filed on Jan. 7, 2020 in the Korean Intellectual Property Office, the disclosure of which is incorporated herein by reference in its entirety.

TECHNICAL FIELD

The present disclosure relates to a tantalum capacitor.

BACKGROUND

Tantalum (Ta) materials are widely used in fields throughout industries such as the electrical, electronic, mechanical, chemical engineering, space, defense, and other industries, due to mechanical and physical characteristics such as relatively high melting points, excellent softness and corrosion resistance, and the like. Such Ta materials have been widely used as positive electrode materials of small capacitors due to characteristics capable of forming stable anodized films, and annual usage thereof has rapidly increased in accordance with rapid developments of information technology (IT) industries such as electronic and information communications in recent years.

Conventional tantalum capacitors may use a structure in which a terminal is led-out without an internal lead frame or a frame, in order to connect the tantalum materials and the electrode.

In this case, the electrode of the tantalum capacitors without use of the existing frame may be led-out as lower electrodes such that a tantalum body and a positive electrode wire are respectively connected to side electrodes. In a structure of an existing side electrode, side electrodes may be formed on lead-out portions by a metal deposition process, and may be then connected to the lower electrodes, respectively. However, the existing side electrode has a problem in that, as the metals are deposited on planar surfaces, a surface area connected to each portion of the tantalum body is significantly limited. Accordingly, equivalent series resistance (ESR) characteristics and bonding strength may be deteriorated.

SUMMARY

An aspect of the present disclosure is to provide a tantalum capacitor capable of having improved contact with a side electrode.

Another aspect of the present disclosure is to provide a tantalum capacitor capable of improving mechanical strength to have excellent reliability.

Another aspect of the present disclosure is to provide a tantalum capacitor capable of reducing equivalent series resistance (ESR).

According to an aspect of the present disclosure, a tantalum capacitor includes a tantalum body having a tantalum wire exposed from one surface; a positive electrode terminal including a first electrode portion connected to the tantalum wire and a second electrode portion connected to be perpendicular to the first electrode portion; a negative electrode terminal spaced apart from the positive electrode terminal, and including a third electrode portion connected to the tantalum body and a fourth electrode portion connected to be perpendicular to the third electrode portion; and a molding portion covering the tantalum body, and configured to expose the first and third electrode portions from opposing surfaces of the molding portion, and expose the second and fourth electrode portions from the same surface of the molding portion, wherein the first electrode portion includes a first protrusion disposed in a tantalum wire direction, and the tantalum wire includes a first groove disposed in a tantalum body direction, wherein the first groove and the first protrusion are connected to each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
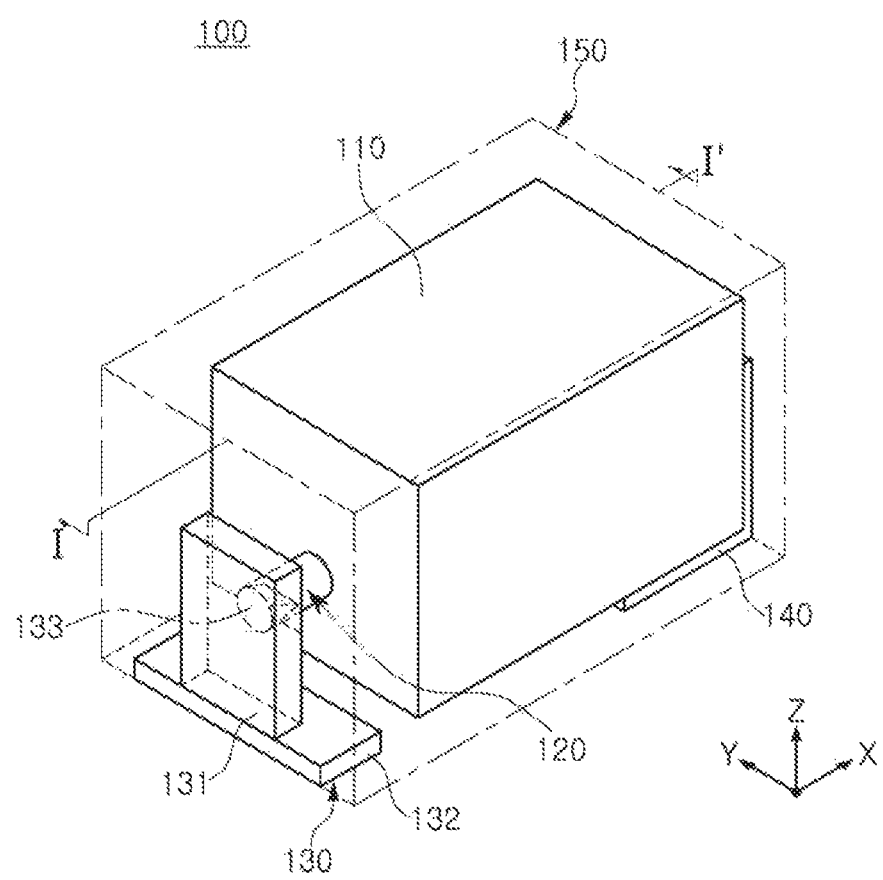
FIG. 1 is a perspective view illustrating a tantalum capacitor according to an embodiment of the present disclosure.

Hereinafter, embodiments of the present disclosure will now be described in detail with reference to the accompanying drawings. However, the present disclosure should not be construed as being limited to the specific embodiments set forth herein, and should be understood that it includes various modifications, equivalents, and/or alternatives of embodiments of the present disclosure. In connection with the description of the drawings, similar reference numerals may be used for similar elements.

In addition, in order to clearly describe the present disclosure in the drawings, portions irrelevant to the description may be omitted, and thicknesses may be enlarged to clearly express various layers and regions, and elements having the same function within the scope of the same idea may be explained using the same reference numerals.

In the present specification, expressions such as "having," "may have," "including," "comprising," "may include," "may comprise," or the like may include the presence of a corresponding characteristic (e.g., a component such as a numerical value, function, operation, or portion), and may not exclude the presence of additional features.

In the present specification, expressions such as "A or B," "at least one of A or/and B," "at least one of A or B," "one or more of A or/and B," or the like may include all possible combinations of the items listed together. For example, "A or B," "at least one of A or/and B," or "at least one of A or B" may include (1) all cases including at least one A, (2) all cases including at least one B, or (3) all cases including both at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
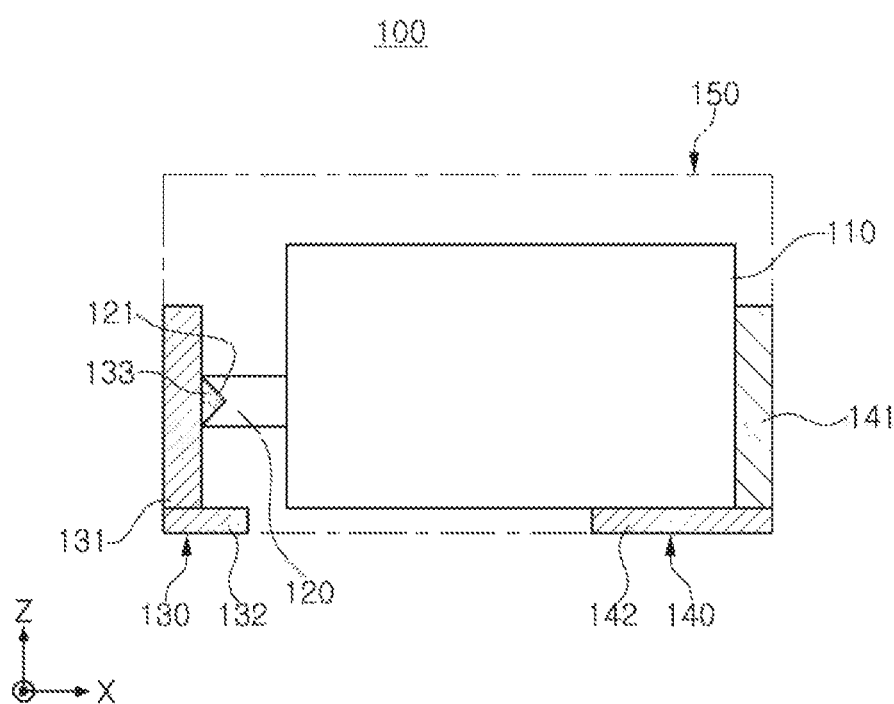
FIGS. 2 and 3 are cross-sectional views taken along line I-I' of FIG. 1.
Figure 3:
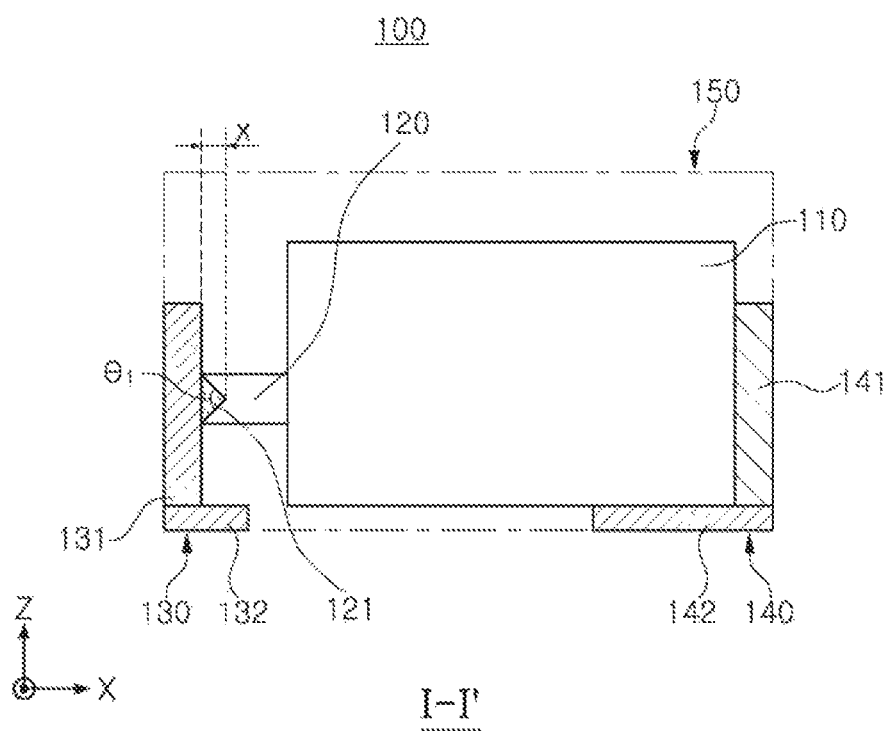

FIG. 1 is a perspective view illustrating a tantalum capacitor according to an embodiment of the present disclosure, and FIGS. 2 and 3 is cross-sectional views of FIG. 1.

Referring to FIGS. 1 to 3, a tantalum capacitor 100 according to an embodiment of the present disclosure may include a tantalum body 110 having a tantalum wire 120 exposed from one surface; a positive electrode terminal 130 including a first electrode portion 131 connected to the tantalum wire 120 and a second electrode portion 132 bent to be perpendicular to the first electrode portion 131; a negative electrode terminal 140 spaced apart from the positive electrode terminal 130, and including a third electrode portion 141 connected to the tantalum body 110 and a fourth electrode portion 142 bent to be perpendicular to the third electrode portion 141; and a molding portion 150 covering the tantalum body 110, and configured to expose the first and third electrode portions 131 and 141 from opposing surfaces of the molding portion, and expose the second and fourth electrode portions 132 and 142 from the same surface of the molding portion, wherein the first electrode portion 131 includes a first protrusion 133 disposed in a tantalum wire 120 direction, and the tantalum wire 120 includes a first groove 121 disposed in a tantalum body 110 direction.

In this case, the first groove 121 and the first protrusion 133 may be connected to each other. Referring to FIGS. 1 to 3, the tantalum wire 120 may have the first groove 121, and the first electrode portion 131 may have the first protrusion 133. The first groove 121 of the tantalum wire 120 and the first protrusion 133 of the first electrode portion 131 may be arranged in a first direction (an X direction) of the molding portion 150, respectively. For example, the first groove 121 of the tantalum wire 120 and the first protrusion 133 of the first electrode portion 131 may be arranged to oppose each other. In the present specification, the expression "the first groove 121 of the tantalum wire 120 and the first protrusion 133 of the first electrode portion 131 may be connected" may refer to a state in which they are in physical contact, and a state in which they are adhered to each other. In the present specification, "adhered" and "adhesion" may refer to a state in which a surface of an adhesive and a surface of an adherend are bonded by bonding force in an interface therebetween. The bonding force in the interface may be due to chemical interaction between surface molecules of the adhesive and surface molecules of the adherend, or may be due to mechanical bonding.

In an embodiment, the first groove 121 of the tantalum wire 120 and the first protrusion 133 of the first electrode portion 131 in the tantalum capacitor 100 of the present disclosure may be engaged with each other. In the present specification, "engaged" may refer to a state in which the grooves and the protrusions are in contact with each other in positions corresponding to each other, and may refer to a state in which the grooves and the protrusions are adhered to each other in positions corresponding to each other. In the present specification, the state in which the grooves and the protrusions are engaged may include an error range. The error range may mean that, for example, an area in which the grooves and the protrusions are in contact with each other may be within a range of 50% or more or 60% or more of an area of the groove, and an upper limit thereof may be 100% of an area of the groove.

In the tantalum capacitor 100 according to the present disclosure, the first groove 121 of the tantalum wire 120 and the first protrusion 133 of the first electrode portion 131 may be connected to each other to increase a contact area of the tantalum wire 120 and the electrode portion 131, thereby reducing equivalent series resistance (ESR).

The tantalum body 110 of the tantalum capacitor 100 according to the present disclosure may be formed by using a tantalum material, and may be produced by, for example, mixing and stirring a tantalum (Ta) powder and a binder at a certain ratio, compressing the mixed powder, molding the compressed powder into a general cuboid form, and then sintering the molded powder under a relatively high temperature and relatively high vacuum.

In addition, the tantalum body 110 may have a tantalum wire 120 exposed in the X direction of the body. The tantalum wire 120 may be mounted by inserting it into a mixture of a tantalum powder and a binder to be eccentric from a center thereof, before compressing the mixture of the tantalum powder and the binder. For example, the tantalum body 110 may be manufactured by inserting a tantalum wire 120 into the tantalum powder mixed with the binder to form a tantalum element having a desired size, and then sintering the tantalum element under a high temperature and high vacuum ($10^{-5}$ torr or less) atmosphere for about 30 minutes.

The tantalum wire 120 may include the first groove 121. The first groove 121 may be disposed at an end of the tantalum wire 120 in the X direction, and may be disposed in a first electrode portion 131 direction of the tantalum wire 120. A method of forming the first groove 121 is not particularly limited. For example, a method of manufacturing a tantalum wire having a groove in advance or mechanically processing an end of the manufactured tantalum wire may be used, but is not limited thereto.

The positive electrode terminal 130 of the tantalum capacitor 100 according to the present disclosure may be made of a conductive metal containing nickel (Ni), tin (Sn), copper (Cu), a chromium titanium intermetallic compound (Cr(Ti)), palladium (Pd), iron (Fe) and/or an alloy thereof, and may include the first electrode portion 131, the second electrode portion 132, and the first protrusion 133. The first electrode portion 131 may be a portion exposed from a first side surface of the molding portion 150 to serve as a terminal, when a substrate is mounted thereon, the second electrode portion 132 may be a portion disposed to be connected to the first electrode portion 131 in a Z direction perpendicular to a tip of one side of the first electrode portion 131, and, in this case, an outer surface of the second electrode portion 132 in the X direction may be exposed from the first side surface of the molding portion 150, to improve electrical connection, while solder is bonded thereto when the substrate is mounted thereon.

In addition, when necessary, a lead portion disposed on an upper end and/or a lower end of the second electrode portion 132, and protruding in the X direction of the molding portion 150 may be further included. The lead portion may be used as a connection terminal, when the substrate is mounted thereon.

A method for forming the first protrusion is not particularly limited. For example, a conductive paste or the like may be applied on the first electrode portion, and may be fired to form the first protrusion, or a first electrode portion to be formed as the first protrusion may first be prepared by a mechanical process, and may be then attached thereto. Alternatively, when the first electrode portion and/or the third electrode portion is formed by an evaporation process as described later, a conductive metal may be deposited in the first groove of the tantalum wire.

The negative electrode terminal 140 of the tantalum capacitor 100 according to the present disclosure may be made m of a conductive metal containing nickel (Ni), tin (Sn), copper (Cu), a chromium titanium intermetallic compound (Cr(Ti)), palladium (Pd), iron (Fe) and/or an alloy thereof, and may include the third electrode portion 141 and the fourth electrode portion 142. The third electrode portion 141 may be disposed to be spaced apart from each other in the X direction with the first electrode portion 131 of the positive electrode terminal 130 in parallel, the tantalum body 110 may be mounted on an inner surface of the third electrode portion 141, and the third electrode portion 141 may be electrically connected to the tantalum body 110. In addition, an outer surface of the third electrode portion 141 may be exposed from a second side surface of the molding portion 150 to serve as a terminal, when the substrate is mounted thereon. The fourth electrode portion 142 may be a portion disposed to be connected to the first electrode portion 131 in a Z direction perpendicular to a tip of one side of the third electrode portion 141, and an outer surface of the fourth electrode portion 142 in the X direction may be exposed from the second side surface of the molding portion 150, to improve electrical connection, while solder is bonded thereto when the substrate is mounted thereon.

In this case, when necessary, a lead portion disposed on an upper end and/or a lower end of the fourth electrode portion 142, and protruding in the X direction of the molding portion 150 may be further included. The lead portion may be used as a connection terminal, when the substrate is mounted thereon.

In an embodiment, the first electrode portion 131 and the third electrode portion 141 of the tantalum capacitor 100 of the present disclosure may be a deposition layer. The deposition layer may be a deposition layer of a conductive metal. Non-limiting examples of the conductive metal may include copper (Cu), nickel (Ni), tin (Sn), palladium (Pd), platinum (Pt), gold (Au), silver (Ag), tungsten (W), Titanium (Ti), iron (Fe), lead (Pb), and alloys thereof, but are not limited thereto. In addition, as a deposition method to be used to prepared the deposition layer, a method such as a chemical vapor deposition (CVD) process, a physical vapor deposition (PVD) process, a sputtering process, a spin coating process, a vacuum deposition process, a plasma vapor deposition process, or an atomic layer deposition (ALD) process may be used, but are not limited thereto. When the first and third electrode portions 131 and 141 are formed by a deposition process, a deposition layer may be concentrated in the first groove 121 disposed on the tantalum wire 120, and a metal deposition layer thicker than a peripheral portion may be formed, as the first groove 121 is filled.

In an embodiment of the present disclosure, the first protrusion 133 included in the first electrode portion 131 of the tantalum capacitor 100 according to the present disclosure may have a protruding distance within a range from 0.1 µm to 5 mm. Referring to FIG. 3, a distance (x) of the first protrusion m 133 may be 0.1 µm or more, 0.15 µm or more, 0.20 µm or more, or 0.25 µm or more, and 5 mm or less, 4.5 mm or less, 4.0 mm or less, 3.5 mm or less, or 3.0 mm or less. When the distance (x) of the first protrusion 133 is less than 0.1 µm, a sufficient ESR reduction effect may not be obtained. When the distance (x) of the first protrusion 133 is more than 5 mm, processing of the protrusion and the groove may be difficult. Therefore, production costs may increase.

In an embodiment of the present disclosure, the first protrusion 133 included in the first electrode portion 131 of the tantalum capacitor 100 according to the present disclosure may have a polygonal columnar shape, a polygonal truncated shape, a cylindrical shape, or a conical shape. FIGS. 1 and 2 illustrate a non-limiting example of a first protrusion 133 having a triangular columnar shape and having a side surface attached to the first electrode portion 131. Referring to FIGS. 1 and 2, the first protrusion 133 may have a polygonal columnar shape formed with a lower surface and a side surface. Referring to FIGS. 1 and 2, the first protrusion 133 may have a polygonal columnar shape, and, in this case, a portion attached to the first electrode portion 131 may be a lower surface or a side surface of the polygonal columnar shape, and the first groove 121 of the tantalum wire 120 may have a shape corresponding to the first protrusion 133.

Figure 4:
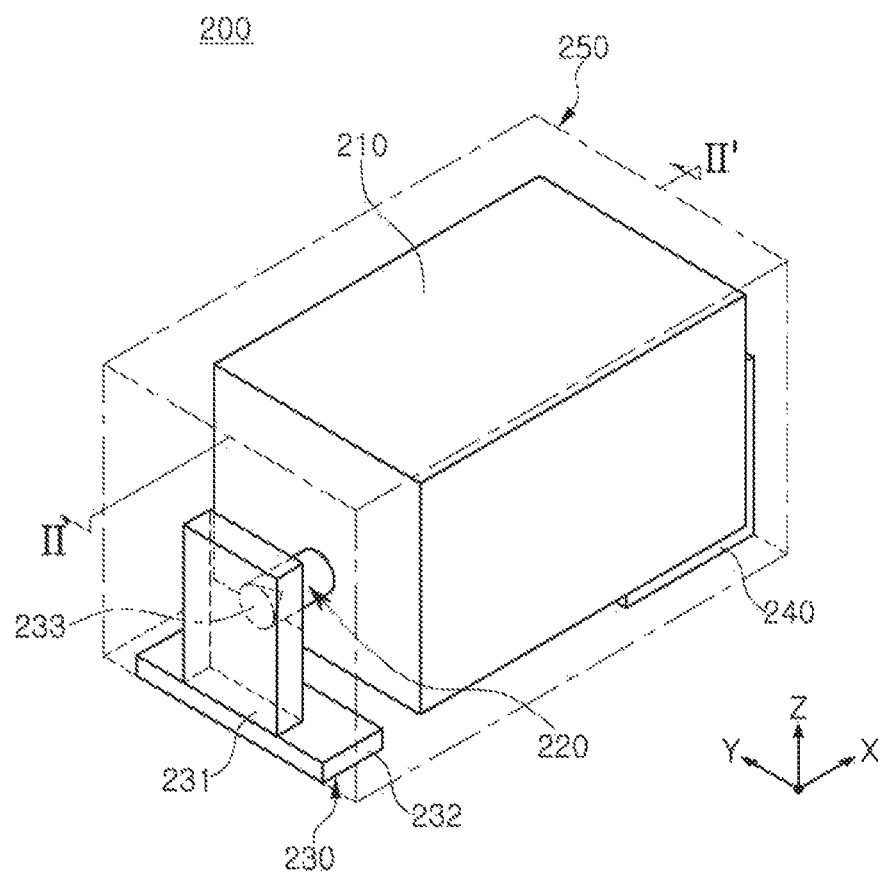
FIG. 4 is a perspective view illustrating a tantalum capacitor according to another embodiment of the present disclosure.
Figure 5:
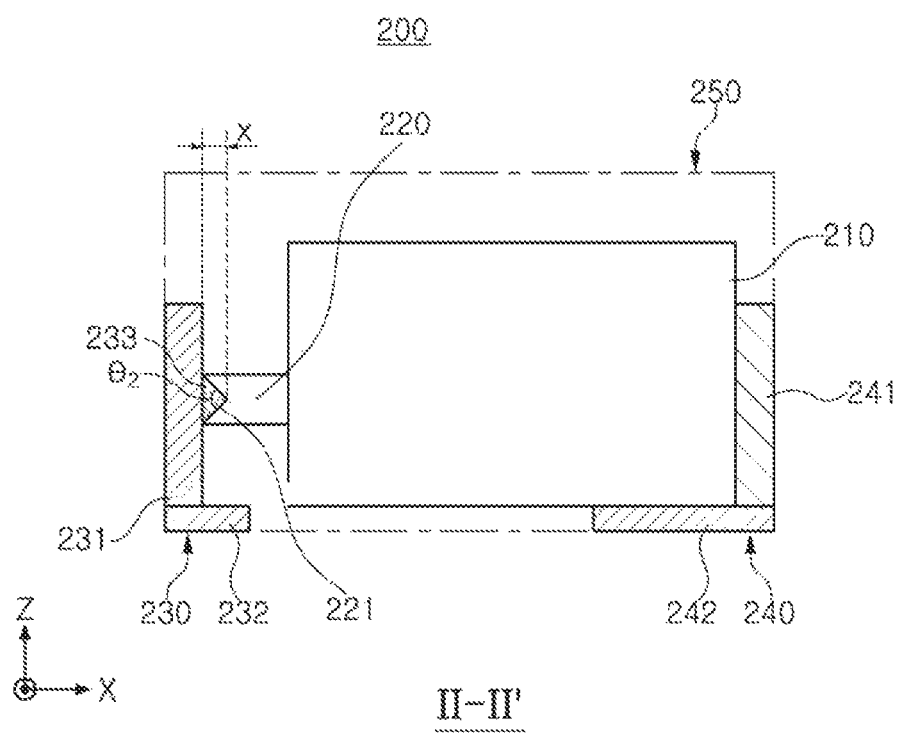
FIG. 5 is a cross-sectional view taken along line II-II' of FIG. 4.

FIGS. 4 and 5 are non-limiting examples illustrating a case in which a first protrusion 233 has a conical shape. Referring to FIGS. 4 and 5, a first protrusion 233 may have a conical shape, and a lower surface of the first protrusion 233 may be attached to a first electrode portion 231. In addition, a first groove 221 of a tantalum wire 220 may have a shape corresponding to the first protrusion 233. As described above, the first protrusions 133 and 233 may have a polygonal columnar shape, a polygonal truncated shape, a cylindrical shape, or a conical shape, to increase a contact area between the grooves and the protrusions and improve mechanical bonding force.

In the embodiments according to the present disclosure, when the first protrusions 133 and 233 have a polygonal shape or a horn shape, angles ($\theta 1$ and $\theta 2$) of the first protrusions 133 and 233 may be within a range of 10° to 170°. The angles ($\theta 1$ and $\theta 2$) of the first protrusions 133 and 233 may refer to a minimum value among angles formed by adjacent side surfaces thereof or a minimum value among angles of a vertex thereof. When the angles ($\theta 1$ and $\theta 2$) of the first protrusions 133 and 233 are less than 10°, the protrusions may be easily damaged in the process of storage and movement of the protrusions and/or the tantalum wires, and when the angles ($\theta 1$ and $\theta 2$) of the first protrusions 133 and 233 are greater than 170°, sufficient ESR reduction effect may not be achieved.

In an embodiment of the present disclosure, the first protrusion 133 of a tantalum capacitor 100 according to the present disclosure may be provided as a plurality of first protrusions 133. When two or more of the first protrusions are disposed, two or more first grooves corresponding to the first protrusions may also be disposed. The number of the first protrusions 133 may be two or more, and an upper limit thereof is not particularly limited, but may be, for example, 100 or less. When the plurality of first protrusions 133 are disposed as in this embodiment, a contact area between the tantalum wire 120 and the first electrode portion 131 may be significantly increased.

Figure 6:
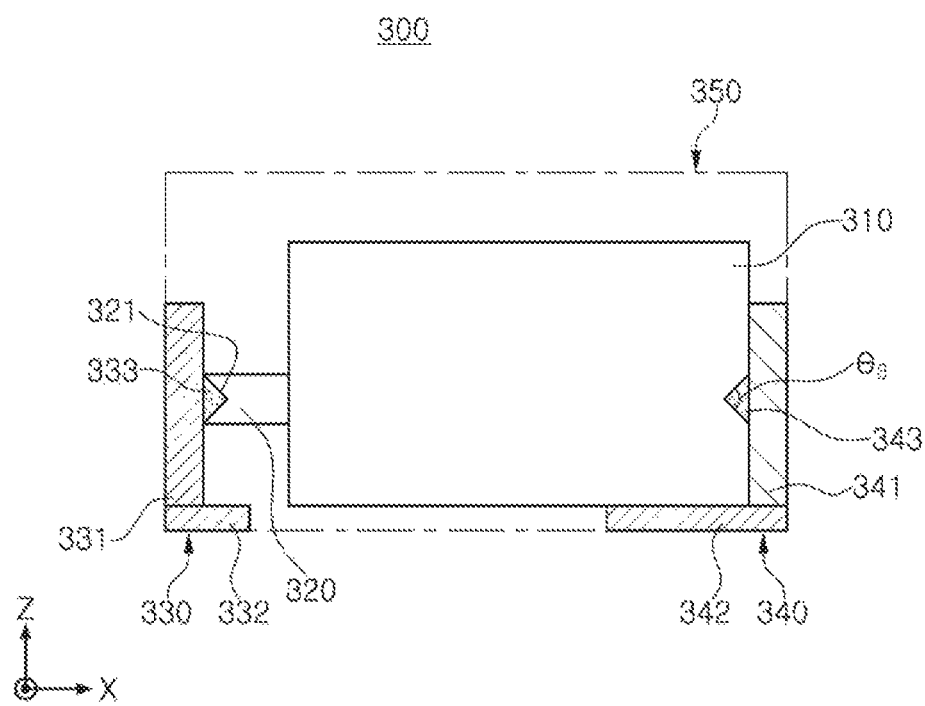
FIG. 6 is a cross-sectional view illustrating a tantalum capacitor according to another embodiment of the present disclosure.

In another embodiment of the present disclosure, shown in FIG. 6, a third electrode portion 341 of a tantalum capacitor 300 according to the present disclosure may include a second protrusion 343 disposed in a tantalum body 310 direction. In addition, when the second protrusion 343 is disposed on the third electrode portion 341, a tantalum body 310 may include a second groove, wherein the second protrusion 343 and the second groove may be connected to each other. The second groove of the tantalum body 310 and the second protrusion portion 343 of the third electrode portion 341 may be arranged in the first direction (the X direction) of a molding portion 350, respectively. For example, the second groove of the tantalum body 310 and the second protrusion 343 of the third electrode portion 341 may be arranged to oppose each other.

In an embodiment, the second protrusion 343 included in the third electrode portion 341 of the tantalum capacitor 300 according to the present disclosure may have a protruding distance within a range of 0.1 µm to 5 mm. The distance of the second protrusion 343 may be 0.1 µm or more, 0.15 µm or more, 0.20 µm or more, or 0.25 µm or more, and 5 mm or less, 4.5 mm or less, 4.0 mm or less, 3.5 mm or less, or 3.0 mm or less. When the distance of the second protrusion 343 is less than 0.1 µm, a sufficient ESR reduction effect may not be obtained. When the distance of the second protrusion 343 is more than 5 mm, processing of the protrusion and the groove may be difficult. Therefore, production costs may increase. Since descriptions of shapes, angles ($\theta_3$), and the like of the second protrusions and the second grooves may be applied to the same contents as those of the first protrusions and the first grooves, a detailed description thereof will be omitted.

Figure 7:
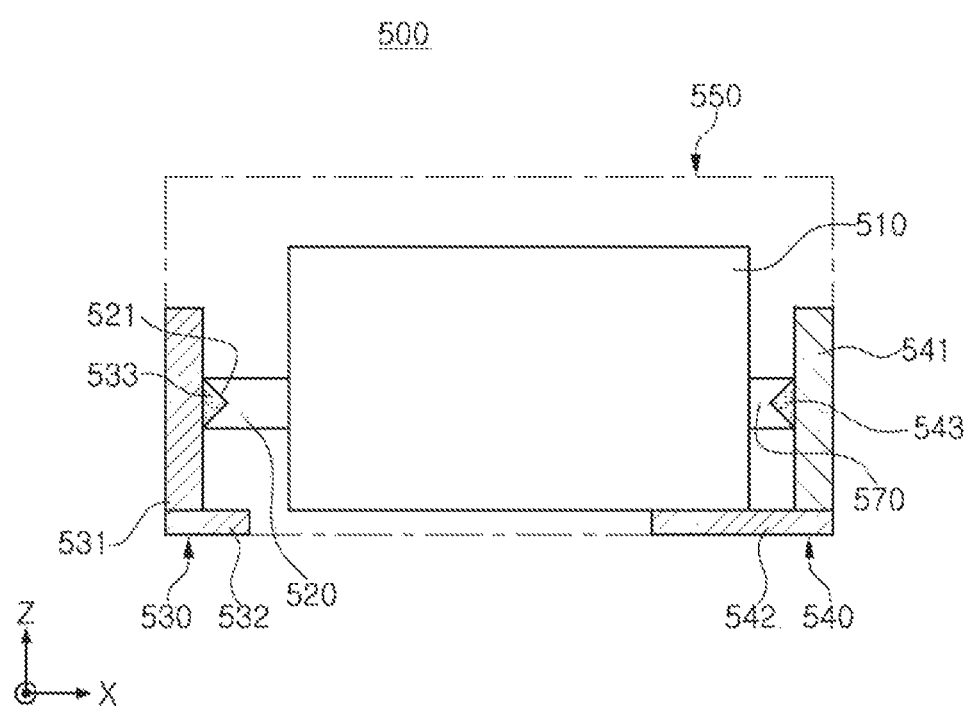
FIG. 7 is a cross-sectional view illustrating a tantalum capacitor according to another embodiment of the present disclosure.

In another embodiment of the present disclosure, shown in FIG. 7, in a tantalum capacitor 500 according to the present disclosure, a negative electrode connection member 570 may be disposed between a tantalum body 510 and a third electrode portion 541. In this case, the negative electrode connection member 570 may be provided with a third groove in a third electrode portion 541 direction, and a second protrusion 543 and the third groove may be connected. The negative electrode connection member 570 may serve to connect the tantalum body 510 and the third electrode portion 541, and improve fixing strength of a negative electrode terminal 540.

In the embodiment, the negative electrode connection member 570 may include a base resin and a conductive metal. More specifically, the negative electrode connection member 570 may be a conductive adhesive layer comprising the conductive metal and the base resin. The conductive adhesive layer may include a conductive metal, and the conductive metal may be in a form of a powder particle. A shape of the conductive metal powder particle may be spherical or flake-shaped. In the conductive resin layer, the conductive metals may be disposed to be in contact with or adjacent to each other, and the base resin may be disposed to surround the metal particles. The conductive metal is not particularly limited as long as it is a particle of a metal having excellent conductivity, and may include, for example, copper (Cu), nickel (Ni), tin (Sn), palladium (Pd), platinum (Pt), gold (Au), silver (Ag), tungsten (W), titanium (Ti), iron (Fe), lead (Pb), and alloys thereof.

The base resin may be a thermosetting resin. The thermosetting resin may be a phenol resin, a urea resin, a diallyl phthalate resin, a melanin resin, a guanamine resin, an unsaturated polyester resin, a polyurethane resin, an epoxy resin, an aminoalkyd resin, a melamine-urea co-condensation resin, a silicon resin and/or a polysiloxane resin, but is not limited thereto.

Figure 8:
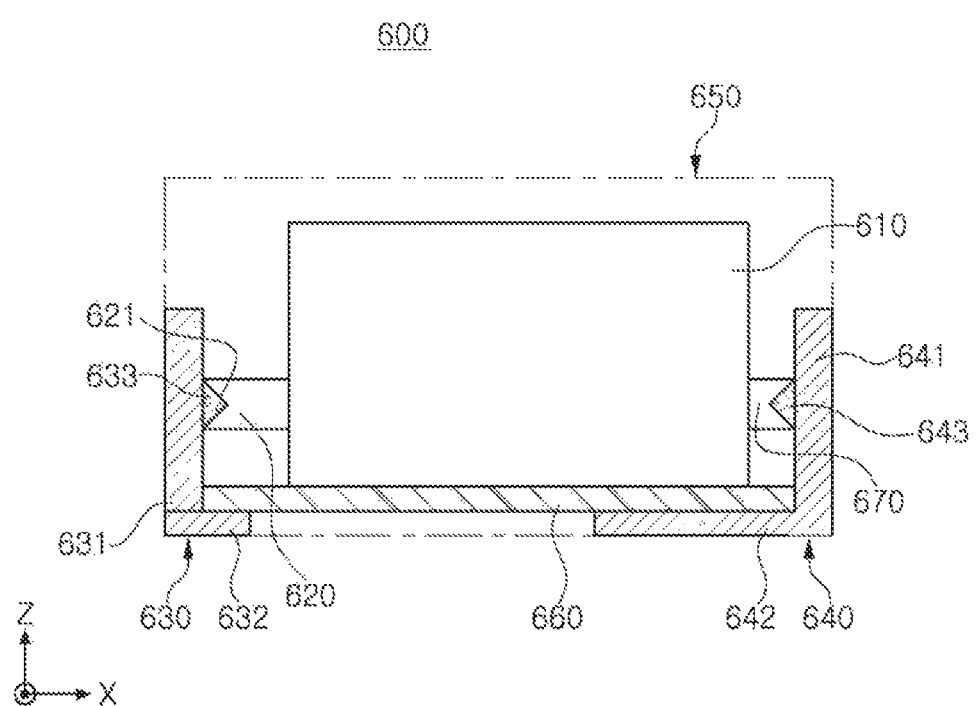
FIG. 8 is a cross-sectional view illustrating a tantalum capacitor according to another embodiment of the present disclosure.

In an embodiment of the present disclosure, an insulating layer 660 may be disposed on a positive electrode terminal 630 and a negative electrode terminal 640 of a tantalum capacitor 600 according to the present disclosure. FIG. 8 is a cross-sectional view illustrating the tantalum capacitor 600 according to the present embodiment. Referring to FIG. 8, the insulating material 660 may be disposed in a space between the positive electrode terminal 630 and the negative electrode terminal 640 and the tantalum body 610. The insulating material 660 is not particularly limited as long as it has sufficient insulating properties. For example, a polymer resin, ceramic, or the like may be exemplified, but are not limited thereto. When the insulating layer 660 is disposed between the tantalum body 610 and the positive electrode terminal 630 and the negative electrode terminal 640, although some elements are deviated from a desired position in a process of manufacturing the tantalum capacitor 600 of the present disclosure, the occurrence of defects such as short-circuits or the like may be prevented.

The tantalum capacitor 100 according to the present disclosure may be surrounded by the molding portion 150. The molding portion 150 may be formed by performing a transfer molding process on a resin such as an epoxy molding compound (EMC) to surround the tantalum body 110. The molding portion 150 may serve to protect the tantalum wire 120 and the tantalum body 110 from the outside, and may serve to insulate the tantalum body 110 and the positive electrode terminal 130 from each other.

In addition, the molding portion 150 may be formed such that the lower surface of the second electrode portion 132 of the positive electrode terminal 130 and the lower surface of the fourth electrode portion 142 of the negative electrode terminal 140 are exposed, and the outer surface of the first electrode portion 131 of the positive electrode terminal 130 in the X direction and the outer surface of the third electrode portion 141 of the negative electrode terminal 140 in the X direction are exposed. In this case, the lower surface of the molding portion 150 may be formed to be coplanar with the lower surface of the second electrode portion 132 and the lower surface of the fourth electrode portion 142, one surface of the molding portion 150 in the X direction may be formed to be coplanar with the outer one surface of the first electrode portion 131, the other surface of the molding portion 150 in the X direction may be formed to be coplanar with the outer surface of the third electrode portion 141.

According to an embodiment of the present disclosure, a tantalum capacitor capable of having improved contact with a side electrode may be provided.

According to another embodiment of the present disclosure, a tantalum capacitor capable of improving mechanical strength to have excellent reliability may be provided.

According to another embodiment of the present disclosure, ESR of a tantalum capacitor may be reduced by increasing a contact area.

However, various and beneficial advantages and effects of the present disclosure may be not limited to the above, and may be more easily understood in the process of describing the specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A tantalum capacitor comprising:
   a tantalum body having a tantalum wire exposed from one surface;
   a positive electrode terminal including a first electrode portion connected to the tantalum wire and a second electrode portion connected to be perpendicular to the first electrode portion;
   a negative electrode terminal spaced apart from the positive electrode terminal, and including a third electrode portion connected to the tantalum body and a fourth electrode portion connected to be perpendicular to the third electrode portion; and
   a molding portion covering the tantalum body, and configured to expose the first and third electrode portions from opposing surfaces of the molding portion, and expose the second and fourth electrode portions from the same surface of the molding portion, wherein the first electrode portion includes a first protrusion disposed in a tantalum wire direction, and the tantalum wire includes a first groove disposed at a center of a side surface thereof in a tantalum body direction, wherein the first groove and the first protrusion are connected to each other.

2. The tantalum capacitor according to claim 1, wherein a protruding distance of the first protrusion is in the range of 0.1 µm to 5 mm.

3. The tantalum capacitor according to claim 1, wherein the first protrusion and the first groove are engaged.

4. The tantalum capacitor according to claim 1, wherein the first protrusion is provided as a plurality of first protrusions.

5. The tantalum capacitor according to claim 1, wherein the third electrode portion comprises a second protrusion disposed in the tantalum body direction.

6. The tantalum capacitor according to claim 5, wherein the tantalum body comprises a second groove, wherein the second protrusion and the second groove are connected to each other.

7. The tantalum capacitor according to claim 5, wherein a protruding distance of the second protrusion is in the range of 0.1 µm to 5 mm.

8. The tantalum capacitor according to claim 5, wherein the second protrusion is provided as a plurality of second protrusions.

9. The tantalum capacitor according to claim 5, wherein a negative electrode connection member is disposed between the tantalum body and the third electrode portion, wherein a third groove is disposed on the negative electrode connection member in a third electrode portion direction, wherein the second protrusion and the third groove are connected to each other.

10. The tantalum capacitor according to claim 9, wherein the negative electrode connection member comprises a base resin and a conductive metal.

11. The tantalum capacitor according to claim 1, wherein the first and third electrode portions are deposition layers.

12. The tantalum capacitor according to claim 1, wherein an insulating layer is disposed between the tantalum body and the second and fourth electrode portions.

13. A tantalum capacitor, comprising:

a molding portion having a pair of side surfaces opposing each other in a longitudinal direction;

a positive electrode terminal comprising a first electrode portion having an outer surface exposed from a first of the side surfaces, and a second electrode portion perpendicularly connected to the first electrode portion and being exposed from a surface connecting the pair of side surfaces, the first electrode portion comprising a first protrusion disposed on an inner surface thereof in the longitudinal direction;

a negative electrode terminal comprising a third electrode portion having an outer surface exposed from a second of the side surfaces, and a fourth electrode portion perpendicularly connected to the third electrode portion and being exposed from the surface connecting the pair of side surfaces and spaced apart from the second electrode portion;

a tantalum body enclosed in the molding portion and connected to an inner surface of the third electrode portion; and a tantalum wire exposed from a side surface of the tantalum body and having a first groove disposed therein in the longitudinal direction, the tantalum wire extending in the longitudinal direction toward the first electrode terminal such that the first protrusion contacts and is accommodated inside the first groove.

14. The tantalum capacitor according to claim 13, wherein the first protrusion has a shape selected from the group consisting of: a polygonal columnar shape, a polygonal truncated shape, a cylindrical shape, a conical shape, and a combination thereof.

15. The tantalum capacitor according to claim 13, wherein the first protrusion and the first groove have mating shapes such that the first protrusion and the first groove are engaged.

16. The tantalum capacitor according to claim 13, wherein a minimum value among angles of a vertex of the first protrusion is in a range from 10° to 170°.

17. The tantalum capacitor according to claim 13, the third electrode portion comprises a second protrusion disposed on an inner surface thereof in the longitudinal direction.

18. The tantalum capacitor according to claim 13, wherein the first protrusion comprises a plurality of protrusions.

* * * * *